April 24, 1951 — J. E. HANSEN — 2,550,348
EYEGLASS CONSTRUCTION
Filed Nov. 27, 1948
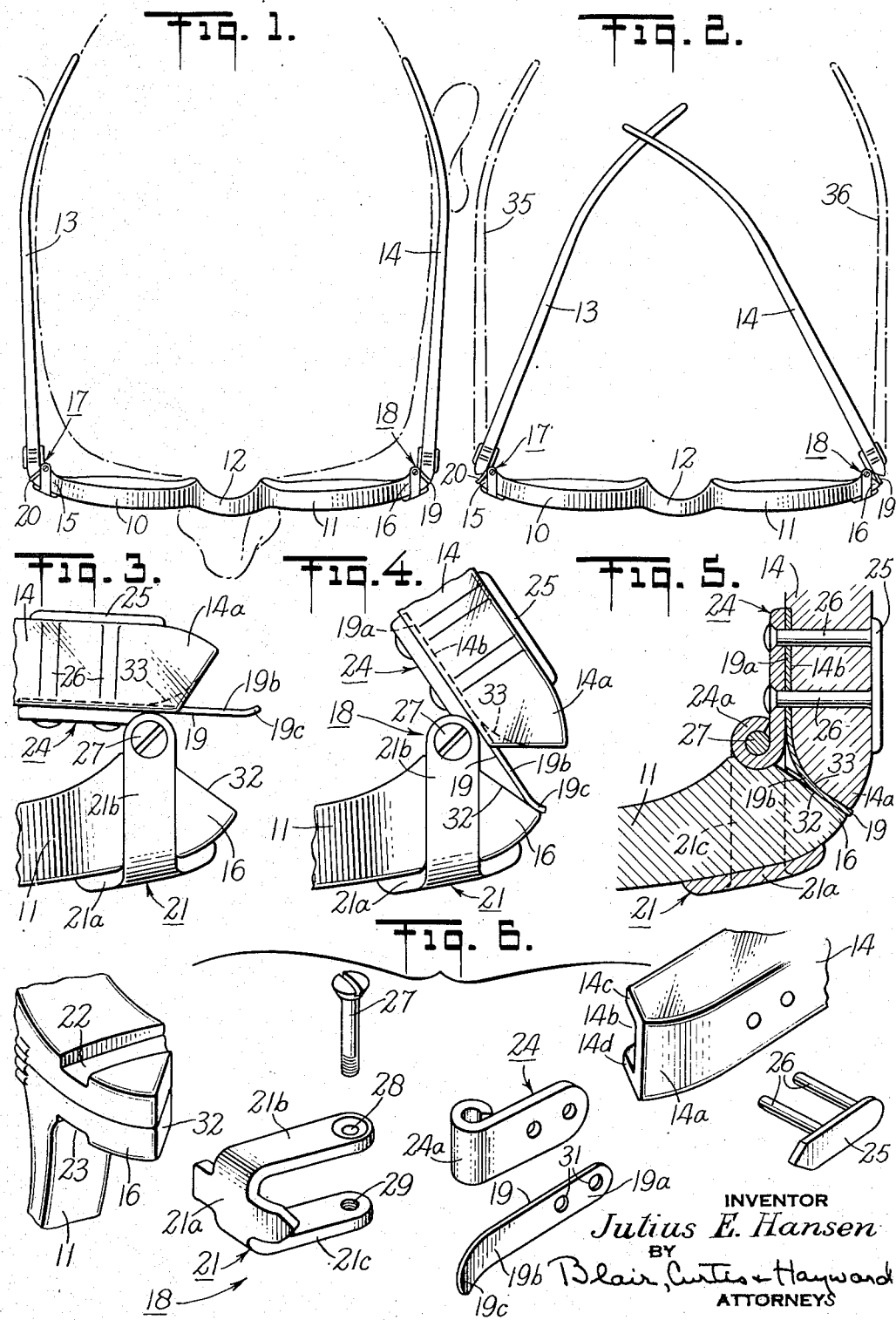
INVENTOR
Julius E. Hansen
BY Blair, Curtis & Hayward
ATTORNEYS Patented Apr. 24, 1951

2,550,348

UNITED STATES PATENT OFFICE 2,550,348

EYEGLASS CONSTRUCTION

Julius E. Hansen, Providence, R. I., assignor to Bay State Optical Company, Attleboro, Mass.

Application November 27, 1948, Serial No. 62,313

3 Claims. (Cl. 88—53)

This invention relates to an eyeglass frame.

One of the objects of this invention is to provide an eyeglass frame which is simple, practical and thoroughly durable. Another object is to provide an eyeglass frame having the above characteristics which will be sturdy and well able to withstand continuous hard usage. Another object is to provide an eyeglass frame of the above character whose manufacture will be economical, both from the standpoint of labor and materials used. Another object is to provide an eyeglass frame of the above character which has a minimum of individual parts, thus greatly facilitating the assembly thereof. Another object is to provide an eyeglass frame of the above character in which the temples securely grip the head of the user so that a frame will stay in position at all times. Still another object is to provide an eyeglass frame of the above character in which the degree of pressure exerted by the temples upon the head of the wearer may be readily adjusted. Other objects will be in part obvious and in part pointed out hereinafter.

The invention accordingly consists in the features of construction, combinations of elements, and arrangements of parts, all as will be illustratively described herein, and the scope of the application which will be indicated in the following claims.

In the accompanying drawing in which is shown one of the various possible embodiments of this invention, Figure 1 is a top plan view of the frame mounted upon the diagrammatically illustrated head of a wearer;

Figure 2 is a top plan view of the frame shown in Figure 1 with the temples partially folded;

Figure 3 is an enlarged top plan view of the connection between a temple and the front of the frame with the temple in a folded position;

Figure 4 is a view similar to Figure 3 with the temple in a partially open position;

Figure 5 is a view similar to Figure 3 with the temple in an open position; and

Figure 6 is an exploded perspective view of the portions of the frame shown in Figure 3.

Similar reference characters refer to similar parts throughout the several views of the drawing.

As conducive to a clearer understanding of certain features of this invention, it should be pointed out that constructions of this type heretofore developed are characterized by their complexity. Because of the large number of parts utilized in forming the endpiece structure in these constructions, they are exceedingly difficult to manufacture. Furthermore, there are a large number of places in these constructions where dirt collects and detracts from the appearance of the frame. A further difficulty experienced with the types now in existence lies in the fact that it is difficult, if not impossible, to adjust the degree of pressure exerted by the temples upon the head of the wearer. This is important, as excess pressure can cause considerable discomfort to the wearer, and a lack of pressure nullifies the purpose of this type of frame, namely, holding the frame in correct position upon the head of the wearer. Accordingly, it is another object to overcome the above-mentioned difficulties, as well as many others.

It might here be noted that reference hereinafter to an "outward" direction signifies a direction to the right or the left of the center of the bridge of an eyeglass frame in the direction of the temple, while the term "inward" denotes a direction toward the center of the bridge from one of the temples. A "rearward" direction refers to a direction toward the face of a wearer, whereas the term "forward" denotes the opposite direction thereto. An "upward" direction refers to a direction upwardly from the face of a wearer, while a "downward" direction is opposite thereto.

In general, the frame includes a pair of rims 10 and 11 connected by a bridge 12. A pair of temples 13 and 14 are hingedly connected to endpieces 15 and 16 by metal fittings, generally indicated at 17 and 18. A pair of substantially flat leaf springs 19 and 20 are mounted on temples 13 and 14 and are so positioned that their forward ends bear against the rear faces of endpiece portions 15 and 16 when the temples are spread. These springs resiliently coact with the endpiece portions to resiliently press the rear ends of the temples toward each other when they are in position upon the head of the wearer, as shown in Figure 1.

Referring now to the drawings in detail, the invention disclosed herein is shown used on a frame, the endpiece portions 15 and 16 (Figure 6) of which are split horizontally in two sections. As the connection of each temple to the front of the frame is substantially similar, specific description of the connection of the temples to the front of the frame will be limited to the connection of temple 14 to endpiece portion 16. The two sections of endpiece portion 16 are held in assembled relationship by a metal fitting, generally indicated at 21. This fitting is U-shaped and includes a foot portion 21a and a pair of leg portions 21b and 21c. Foot portion 21a abuts against the forward face of endpiece portion 16 (Figure 3) and legs 21b and 21c are positioned in grooves 22 and 23 (Figure 6) above and below the endpiece.

The forward portion 14a of temple 14 (Figure 6) has a hinge plate, generally indicated at 24, mounted thereon by means of plaque 25 and rivets 26. Hinge plate 24 has a hinge barrel 24a formed thereon which is pivotally connected to fitting 21 by means of screw 27. In assembly, screw 27 passes through a hole 28 in leg 21b of fitting 21, through the hole in barrel 24a, and threads into a hole 29 in leg 21c.

Before hinge plate 24 is mounted on temple 14, the rear end of leaf spring 19 is positioned in a channel 14b cut into the inside of the forward end of temple 14. Leaf spring 19 has a pair of holes 31 (Figure 6) therein through which rivets 26 pass before they pass through hinge plate 24. When rivets 26 are headed, as shown in Figure 5, the rear portion 19a of spring 19 is clamped between hinge plate 24 and the inner surface of temple 14. This securely mounts spring 19 on temple 14.

The forward portion 19b of spring 19 (Figure 4) extends a substantial distance beyond the forward end of hinge plate 24. Thus, when barrel 24a is connected to fitting 18 by screw 27, the forward end 19c of spring 19 is so positioned that it engages the outer portion of surface 32 of endpiece 16 when the temples are spread. After engaging surface 32, upon further outward movement of temple 14, spring 19 is supported by the curved surface 33 (Figure 5) on the forward end of temple 14. This surface effectively prevents damage that might occur to the spring if it bent about a single fulcrum point. It should be noted that the sides 14a and 14b (Figure 6) extend outwardly beyond curved surface 33 and thus hide the spring 33 when the frame is in use.

Referring to Figure 3, when temple 14 is in a closed position, spring 19 is free so that it does not exert any force upon any portion of the frame. When the temple is halfway open, as shown in Figures 2 and 4, the forward end 19c of spring 19 engages surface 32. As temple 14 is moved outwardly to the position it occupies in Figure 1, the tension upon spring 19 increases, so that when a frame is placed upon the head of a wearer, the rear ends of the temple are resiliently pressed toward each other to securely mount the frame upon the head of the wearer. When the frame is removed from the head of the wearer, the temples are moved inwardly by the springs from the dotted line positions 35 and 36 (Figure 2) to the full line positions shown in this figure. At this time, the temples may be readily closed with a minimum of effort.

If it is desired to adjust the degree of pressure which the temples exert upon the head of the wearer when they are in use, the spring 19 is bent forwardly or rearwardly from the position it occupies in Figure 3. If it is bent forwardly, as viewed in Figure 3, the temples exert increased pressure upon the head of the wearer when the frame is in use, and if spring 19 is bent rearwardly, the reverse effect is achieved.

It will thus be seen that a simple and practical eyeglass frame has been disclosed in which the temples are resiliently pressed toward the user's head to hold a frame in position thereon. By use of applicant's leaf springs, a construction has been disclosed which is neat and attractive in appearance and which is readily adjustable should it be desired to increase or decrease the pressure exerted by the temples. It will thus be seen that the objects mentioned, as well as many others, have been successfully achieved.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

What is claimed is:

1. In non-metallic frame construction, in combination, a frame front, a pair of temples, hinge means connecting said temples to said frame front, the forward ends of said temples being curved forwardly and outwardly and having channels formed therein on their inner surfaces, vertically positioned flat spring means connected to the inner surfaces of said temples adjacent the forward ends of said temples, the forward end portions of said springs engaging the endpiece portions of said frame front as said temples are opened, the outer ends of the endpiece portions of said frame front slanting rearwardly and inwardly, the forward ends of said temples and said endpiece portions forming mitered joints when said temples are in open position, said hinge means being positioned at the inner ends of said mitered joints, the curved forward ends of said temples supporting said springs as said temples are spread, said springs moving into said channels, said spring exerting resilient pressure upon said endpiece portions to urge said temples toward a closed position when they are spread.

2. In non-metallic frame construction, in combination, a frame front, a pair of temples, hinge means connecting said temples to said frame front, the forward ends of said temples being curved forwardly and outwardly, flat spring means connected to the inner surfaces of said temples adjacent their forward ends, said spring means lying in planes passing vertically through said eyeglass frame when it is being worn, the forward tips of said springs being curved forwardly and outwardly, said forward tips engaging the outer ends of the endpiece portions of said frame front as said temples are opened, the outer ends of the endpiece portions of said frame front slanting rearwardly and inwardly, the forward ends of said temples and said endpiece portions forming mitered joints when said temples are in open position, said hinge means being positioned at the inner end of said mitered joint, the curved forward ends of said temples supporting said springs as said temples are spread, said springs exerting resilient pressure upon said endpiece portions to urge said temples toward a closed position when they are spread.

3. In non-metallic frame construction, in combination, a frame front, a pair of temples, said frame front including a pair of endpiece portions, the outer end of said endpiece portions slanting inwardly and rearwardly at an angle substantially 45 degrees to the plane in which said frame front lies, the forward ends of said temples being curved outwardly, the forward end of said temples and the outer ends of said endpiece portions facing each other and forming mitered joints when said temples are in fully open positions, hinges connecting said temples to said endpiece portions, the pivot pins of said hinges being positioned at the inner ends of said mitered joints, vertically positioned flat spring means connected to the inner surfaces of said temples adjacent the forward ends of said temples, the curved surfaces on the forward ends of said temples beginning adjacent said pivot pins and extending to the forward ends of said temples, the forward end of said springs engaging said endpiece portions as said temples are opened, said spring being bent around the curved forward ends of the temples as the temples are moved to a fully open position, whereby said curved surfaces on the forward ends of said temples act as supports for said springs.

JULIUS E. HANSEN.

REFERENCES CITED

The following references are of record in the file of this patent:

UNITED STATES PATENTS

| Number | Name | Date |
|---|---|---|
| 347,738 | Pyle | Aug. 17, 1886 |
| 1,572,733 | McCourt | Feb. 9, 1926 |
| 2,026,723 | Wollensak | Jan. 7, 1936 |

FOREIGN PATENTS

| Number | Country | Date |
|---|---|---|
| 162,502 | Switzerland | Sept. 1, 1933 |
| 312,398 | Italy | Nov. 13, 1933 |